(12) United States Patent
Monson et al.

(10) Patent No.: US 6,388,810 B1
(45) Date of Patent: May 14, 2002

(54) REAR-PROJECTION MIRROR ARRANGEMENT

(75) Inventors: Robert James Monson, St. Paul; Michael Edward Smith, St. Bonifacius, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/457,153

(22) Filed: Dec. 8, 1999

(51) Int. Cl.[7] ............... G03B 21/56; G03B 21/00; G03B 21/14; G03B 21/22; G03B 21/28
(52) U.S. Cl. ............... 359/443; 359/449; 359/460; 353/51; 353/70; 353/78
(58) Field of Search ............... 353/69, 70, 77, 353/78, 50, 51; 359/443, 449, 460

(56) References Cited

U.S. PATENT DOCUMENTS

| | | | |
|---|---|---|---|
| 3,947,104 A | 3/1976 | Waly et al. ............... 353/78 |
| 4,875,064 A | 10/1989 | Umeda ............... 353/78 |
| 5,223,869 A * | 6/1993 | Yanagi ............... 353/78 |
| 5,278,595 A | 1/1994 | Nishida et al. ............... 353/78 |
| 5,521,659 A | 5/1996 | Arnott ............... 353/119 |
| 5,871,266 A * | 2/1999 | Negishi et al. ............... 353/98 |
| 6,233,024 B1 * | 5/2001 | Hiller et al. ............... 348/744 |
| 6,254,239 B1 * | 7/2001 | Hibner, II et al. ............... 353/94 |

* cited by examiner

Primary Examiner—Russell Adams
Assistant Examiner—Magda Cruz
(74) Attorney, Agent, or Firm—Patrick M. Hogan; Glenn W. Bowen

(57) ABSTRACT

A compact projector system utilizing a rear projection console with at least one projector and a set of mirrors with each mirror being positionally placed with respect to the rear of the display screen and operating together by bouncing an image carrying light beam which originates from a projector from one mirror to the next within the console and across itself before the image-carrying light impinges upon the rear of the display screen to produce a relatively large, contiguous image thereupon with the at least one projector and set of mirrors being confined in a relatively small console area.

9 Claims, 3 Drawing Sheets

REAR-PROJECTION MIRROR ARRANGEMENT

FIELD OF THE INVENTION

The present invention pertains to projection systems, and more specifically, to a rear projection console with at least one image-carrying light beam that reflects upon a unique layout of mirrors before impinging upon the rear of the display screen to produce a relatively large, contiguous image thereupon.

BACKGROUND OF THE INVENTION

The use of mirrors to change the direction of a light beam carrying an image is a common practice in rear projection devices. Typically, a light source will bounce from one mirror to another and so on until the light reaches the rear side of a display screen contained within a cabinet, where the image contained within the light will be projected thereon. Traditionally however, these types of mirrors have been fixed, preventing a user from adjusting the image projected to a desired place on the rear projection screen. Typically, the image that is projected is of a single size, even though it may be desirous to enlarge or shrink the image size. Also, in very large applications where an image or images are projected onto a plurality of screens, a seam can appear where image boundaries meet, thereby producing a non-contiguous image.

One of the more difficult design problems in rear projection imagers is the placement of mirrors to optimize limited console space. Many different configurations have been disclosed that reflect images in different ways inside of cabinets, with the initial beam of light being bounced off of at least one mirror in various dispositions. The present invention address the difficulty of limited cabinet space by teaching the projection of an image onto one mirror situated at an oblique angle to the screen, from there onto another mirror positioned at an acute angle with the screen, and finally on through itself to the projection screen. This particular arrangement of mirrors which causes the light to pass through itself without significant degradation of image quality, uses the limited console space in an efficient manner to reduce the actual space required to project an image onto a rear projection screen.

Traditionally in rear projection systems, the mirrors used to reflect a light with an image contained therein have been securably mounted within the rear projection cabinet. By rigidly securing the mirrors within the cabinet, a user is unable to position the image on the screen as desired through mirror manipulation. While this is perhaps a minor inconvenience in a home viewing environment, in applications such as the present invention where multiple projectors can be linked to produce a contiguous image, the inability to shift image position upon the rear projection screen using mirror manipulation is a problem. The present invention facilitates the need for image stability by making the image projector and the mirrors fixedly mounted within the console, yet facilitates the need for image adjustment by allowing alignment adjustment to occur at the second mirror.

In the present invention, the second mirror can also be replaced by either a convex or concave mirror to magnify or reduce the image size as it appears on the display screen. While the use of irregularly shaped mirrors to distort light waves is not new, their use in that manner in combination with a light beam crossing over itself is. In practical application, the irregularly shaped mirrors will allow a sized image on the projection screen otherwise not possible with the limited volume of the console.

In one embodiment of the invention the imager, the mirrors and the display screen rigidly mounted to minimize relative movements between the units thereby minimizing the likelihood of relative movements between the units. In another embodiment the units while rigidly mounted can be made postionable to enable an operator to fine tune the position of the images on the display screen.

Therefore, it is a purpose of this invention to create a compact projection system with an imager that projects an imager-carrying light through a configuration of mirrors and through itself before impinging on the rear of a display screen.

It is a further purpose of this invention to create a projection system that operates in a confined area, or an area of limited space.

It is a further purpose of this invention to create a projection system that can interlock with at least one other projection system of like construct to produce a seamless, contiguous image on a display screen.

It is still another purpose of this invention to create a projection system with mirrors that can be irregularly shaped to produce a magnified or reduced image upon a display screen.

DESCRIPTION OF THE PRIOR ART

U.S. Pat. No. 3,947,104 shows a compact imaging apparatus which projects an image upwards using a series of two fixed mirrors.

U.S. Pat. No. 4,875,064 shows a projecting apparatus that enlarges and displays an image on a liquid crystal display panel onto a screen provided in the projector apparatus.

U.S. Pat. No. 5,278,595 shows a liquid crystal television system that utilizes two fixed mirrors.

U.S. Pat. No. 5,521,659 shows a rear projection display apparatus designed to reduce parallax viewing error so that a user may interact with the display screen using a device such as a light pen.

SUMMARY OF THE INVENTION

The present invention comprises a rear projection console with at least one projector and a set of mirrors operating together to form an image-carrying light beam to travel within the console and across itself before the image-carrying light impinges upon the rear of the display screen to produce a relatively large, contiguous image with the at least one projector and set of mirrors being confined in a relatively small console area. The invention utilizes a unique layout of mirrors, projectors and light paths to create a single, contiguous image on a display screen.

DESCRIPTION OF THE PREFERRED EMBODIMENT

Figure 1:
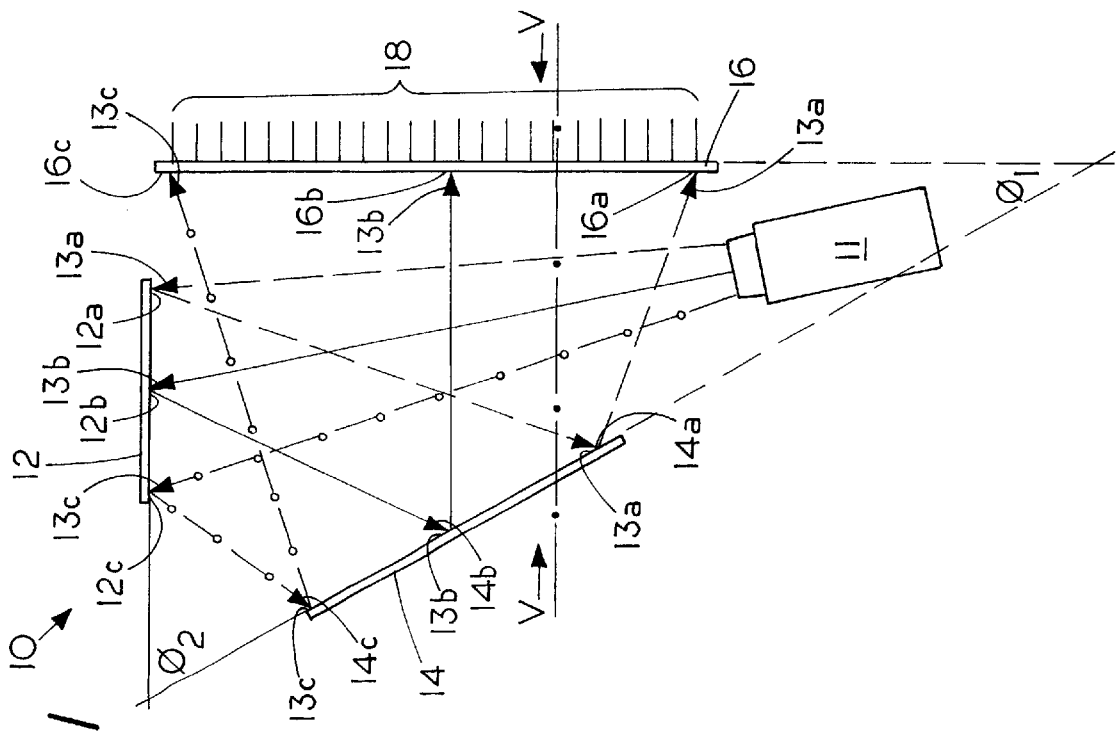
FIG. 1 is a top view of the projector system illustrating the light beam crossing over itself in an initial position.

In FIG. 1, reference numeral 10 generally shows the projector system of the current invention. A viewing screen 16 has a viewing axis indicated by the line "V" running perpendicularly therethrough. A first mirror 12 is positioned laterally and at an oblique angle to viewing screen 16 and at an acute angle with respect to viewing axis "V". A second mirror 14 is positioned at an acute angle $Ø_1$ with respect to viewing screen 16 and at an acute angle $Ø_2$ with respect to first mirror 12. A light emitter 11, usually an imager, is positioned in an area that will not conflict or interfere with any light that is emitted. The imager 11 projects a light beam at first mirror 12. A first peripheral ray 13a contacts the mirror at first edge 12a, a center ray 13b contacts the mirror at the center point 12b, and a second peripheral ray 13c contacts the mirror at second edge 12c. First mirror 12 reflects the beam away from the screen 16 and towards the second mirror 14. The first peripheral ray 13a contacts the second mirror at a first edge 14a, the center ray 13b contacts the second mirror at the center point 14b, and the second peripheral ray 13c contacts the second mirror at the second edge 14c. Second mirror 14 reflects the beam towards the screen 16. The first peripheral ray 13a contacts the view screen at a first edge 16a, the center ray 13b contacts the view screen 16 at a center point 16b, and the second peripheral ray 13c contacts the screen 16 at a second edge 16c. The rays from the imager 11 have thus passed through themselves before appearing on the screen 16 and traveling to a viewer's eye. The outward direction of the rays is generally shown by reference numeral 18. It is apparent to one examining the flow of the light within the console that the image contained within the light beam will effectively be reversed when the light completes its path from imager to screen. However, as the imager envisioned in this application is digital in nature, it is a simple procedure to reverse the image that is to be projected before it leaves the imager thus insuring that the correct image appears on the screen in its proper orientation and form.

Figure 2:
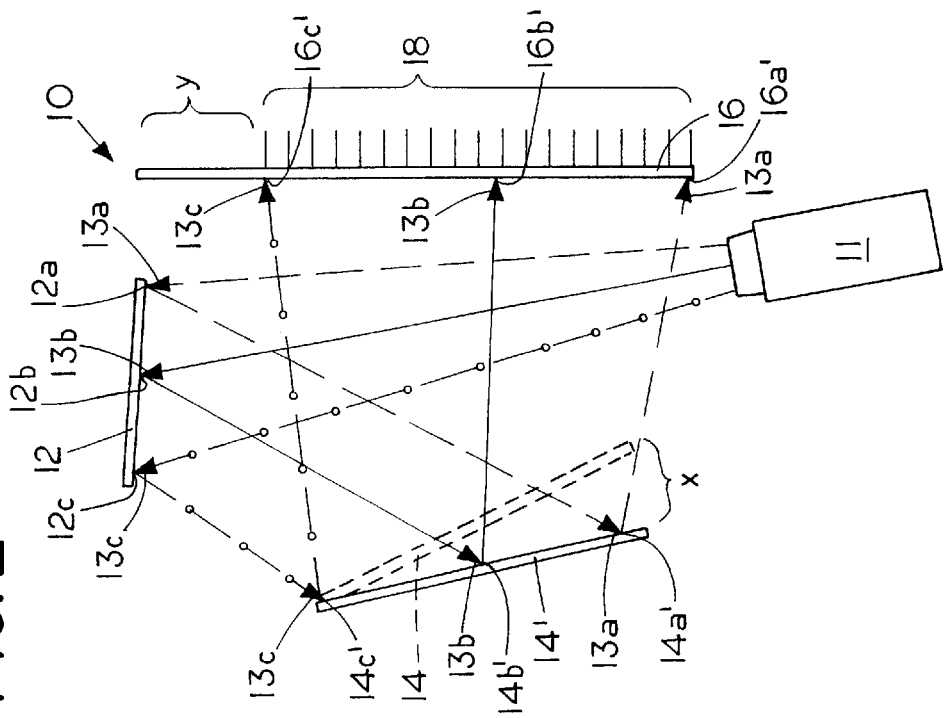
FIG. 2 is a top view of the projector system of FIG. 1 with the second mirror having been adjusted slightly so as to cause the image to shift from the initial position to a second position on the display screen.

An important part of proper image formation is the placement of the first mirror 12 and the second mirror 14 within the console. FIG. 1 illustrates a standard or default condition wherein the rays projected reach the screen 16 and travel outward therefrom. FIG. 2 illustrates the same projector system 10 of FIG. 1, but the second mirror 14 has been displaced a distance "X" into a new position as indicated by numeral 14'. As described earlier, the rays travel from the imager 11 which projects a light beam at first mirror 12. A first peripheral ray 13a contacts the mirror at first edge 12a, a center ray 13b contacts the mirror at the center point 12b, and a second peripheral ray 13c contacts the mirror at second edge 12c. First mirror 12 reflects the beam away from the screen 16 and towards the second mirror 14' which has been moved a distance X from its previous position at 14. The first peripheral ray 13a contacts the repositioned second mirror at a first edge 14a, the center ray 13b contacts the repositioned second mirror at the center point 14b, and the second peripheral ray 13c contacts the repositioned second mirror at the second edge 14c. The repositioned second mirror 14 reflects the beam towards the screen 16 at a different angle than the one described in FIG. 1, and therefore causes the image-carrying light beam to strike the screen 16 at a different location. The first peripheral ray 13a contacts the screen 16 at a first edge 16a', the center ray 13b contacts the screen 16 at the center point 16b', and the second peripheral ray 13c contacts the screen 16 at the second edge 16c'. Thus, collection of rays 18 has been displaced a distance "Y" along the screen surface 16 due to the adjustment of second mirror 14 a distance X to position 14'. It is in this manner that an image could be shifted to appear at a desired spot on a screen surface. In applications where there can be more than one imager producing a single, contiguous image on a screen, the ability to move the projected images to form a complete single image is strongly beneficial.

Figure 3:
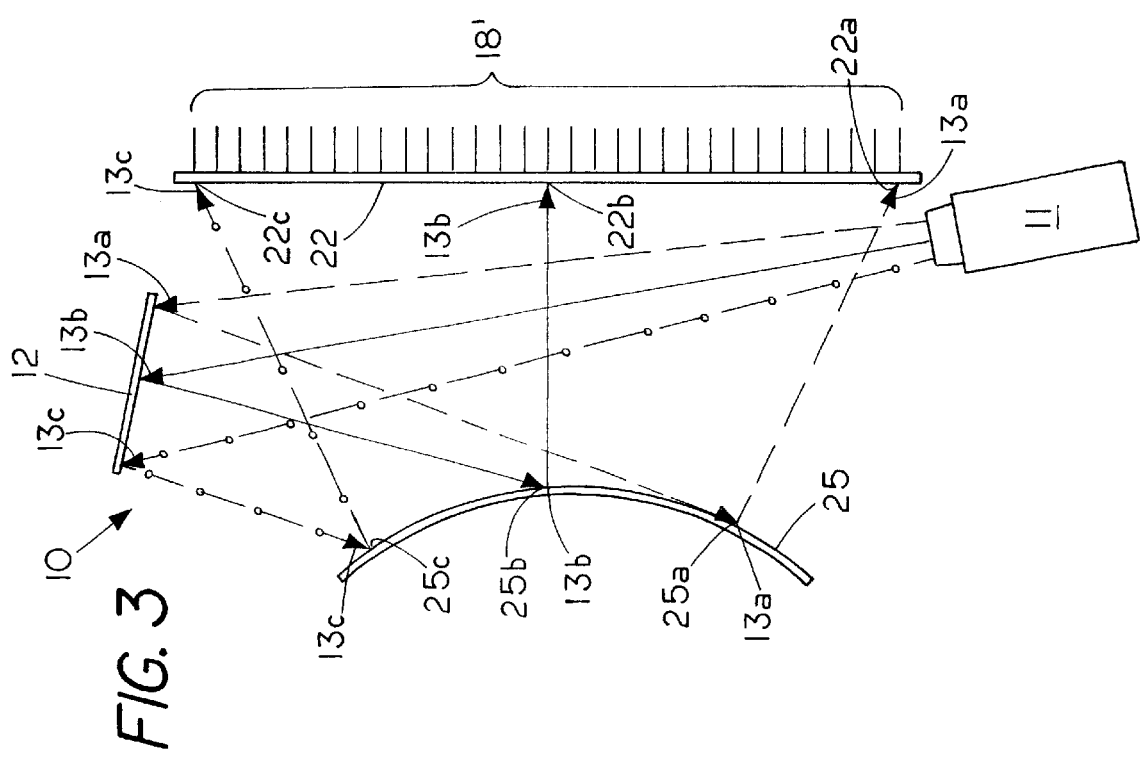
FIG. 3 is a top view of the projector system with the second mirror being in a convex shape.

FIG. 3 shows the projector system of FIG. 1 in use with the second mirror 14 replaced by a convex mirror 25. The image-carrying rays bounce off of the first mirror and then strike the convex mirror 25. A first peripheral ray 13a contacts the convex mirror at first edge 25a, a center ray 13b contacts the convex mirror at the center point 25b, and a second peripheral ray 13c contacts the convex mirror at second edge 25c. At this point in the path from the imager to the screen, the image-carrying light, and more specifically, the beams contained therein, spread out traveling the distance from the convex mirror 25 to the screen 22. The rays spread out a width 18' to cover a large screen 22. It is envisioned that the convex mirror 25 could still be adjusted to allow image 18' movement along screen 22.

Figure 4:
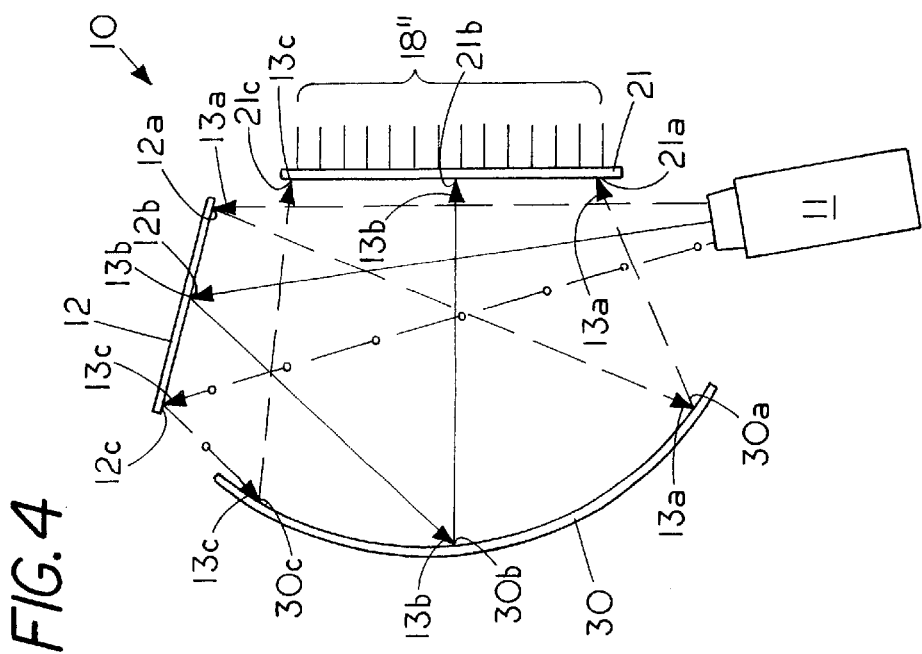
FIG. 4 is a top view of the projector system with the second mirror being in a concave shape.

FIG. 4 shows the projector system of FIG. 1 in use with the second mirror replaced by a concave mirror 30. The light emitter 11 projects a light beam at the first mirror 12. As described in the description of FIG. 1, a first peripheral ray 13a contacts the mirror at first edge 12a, a center ray 13b contacts the mirror at the center point 12b, and a second peripheral ray 13c contacts the mirror at second edge 12c. First mirror 12 reflects the beam away from the screen 16 and towards a concave mirror 30. The first peripheral ray 13a contacts the concave mirror at a first edge 30a, the center ray 13b contacts the concave mirror at the center point 30b, and the second peripheral ray 13c contacts the concave mirror at the second edge 30c. The concave mirror 14 reduces the size of and reflects the beam towards the screen. The first peripheral ray 13a contacts the view screen at a first edge 21a, the center ray 13b contacts the view screen 21 at a center point 21b, and the second peripheral ray 13c contacts the screen 21 at a second edge 21c. The rays from the imager 11 have thus passed through themselves before appearing on the screen 21 and traveling to a viewer's eye. In this way, it can be perceived that the image projected by the imager can be made smaller than would normally be the case if using a flat mirror. It can also be perceived that the resulting image characterized by reference numeral 18" could fit on a smaller screen or on just a portion of a large screen, and that it could also be adjusted to appear on a certain portion of the screen if the concave mirror were adjusted. The image 18" could also be merged with at least one other image to form a single, contiguous image, on a display screen.

Figure 5:
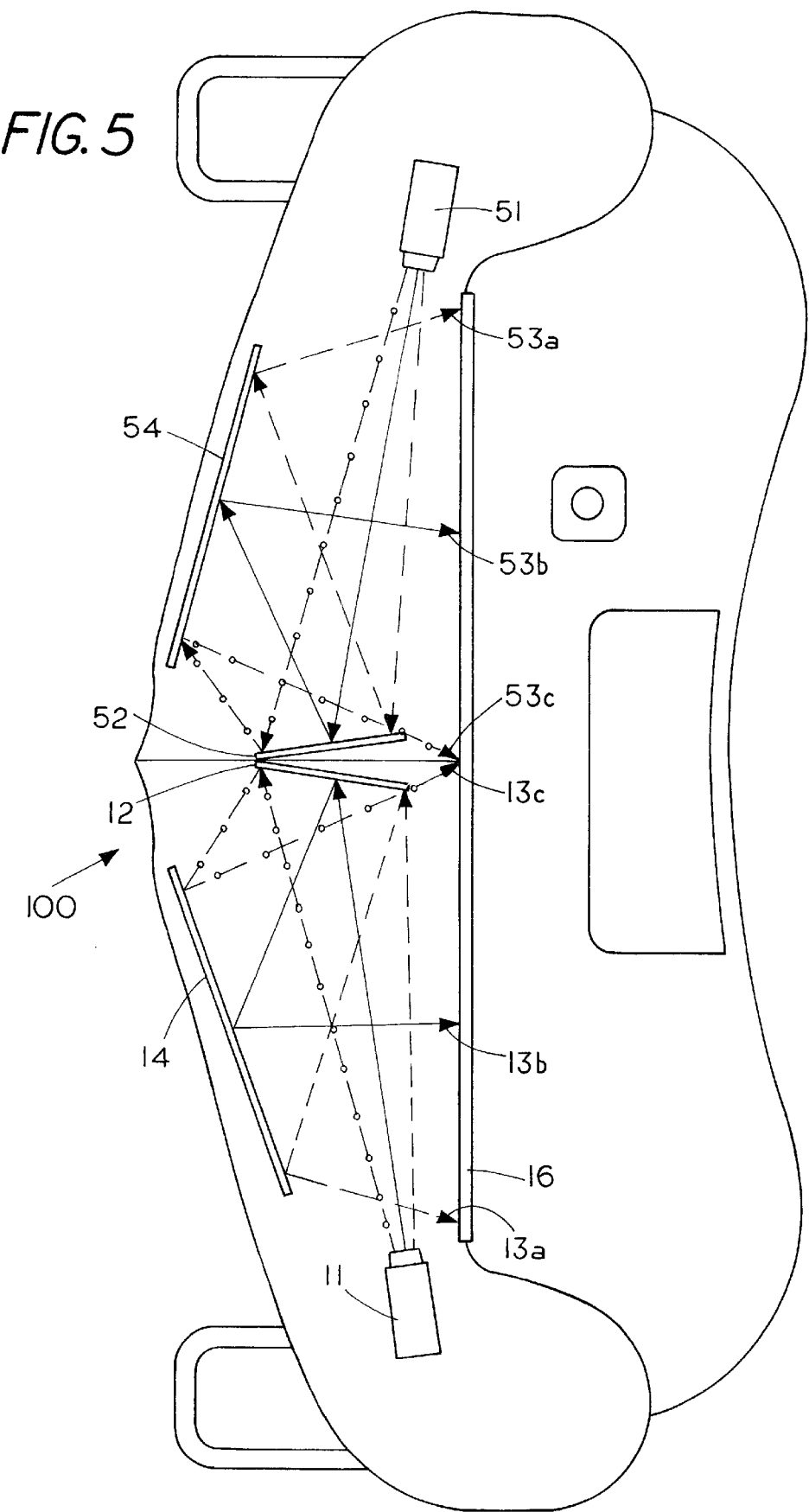
FIG. 5 is a top view of the projector system showing two imagers projecting yet producing a singular, contiguous image on the display screen.

FIG. 5 shows two display systems of the present invention in a console 100. Imager 51 display screen 16 and mirrors 52 and 54 are fixedly mounted within one side of console 100 and display imager 11 and mirrors 12 and 14 are fixedly mounted within the opposite side of console 100 to minimize relative movement between the components. While only two display systems are described herein, it is imagined that a plurality of display systems could be linked together within a console. Projector 11 operates to bounce first peripheral ray 13a, center ray 13b, and second peripheral ray 13c off of the first mirror 12, the second mirror 14, and onto a portion of the back of screen 16. Projector 51 operates in a similar fashion, bouncing an image shown loosely as a first peripheral ray 53a, a center ray 53b, and a second peripheral ray 53c off of a first mirror 52, a second mirror 54, and onto a portion of the display screen 16. Both display systems are completely contained within the console 100. The mirrors and projectors are positioned to project images on to the single screen 16, and by fine tuning of the second mirrors 14 and 54, the images projected by projectors 11 and 51 can be brought together to form a single, contiguous image on view screen 16.

It can be seen with the current invention that it produces an image upon a screen using a unique arrangement of mirrors that cause the image-carrying light to travel through itself before reaching the screen, thus reducing the amount of space needed for image projection. It can also be seen that the display system can be linked with similar or like units within a console to create a single, contiguous image upon a display screen. It can also be seen that the image produced by the imager can be enlarged or reduced by the utilization of convex or concave mirrors as part of the display system.

We claim:

1. A projector system comprising:
    a rear display screen having a back side and a front side with a front viewing surface, said rear display screen having a viewing axis;
        a projector for emitting a light beam carrying an image therein, a first mirror, said first mirror positioned laterally of said viewing axis and at an oblique angle to said display screen so that the light beam from said projector is reflected away from the display screen;
        a second mirror, said second mirror having a curved surface, said second mirror positioned behind said rear display screen so that the light beam from said projector projects between the display screen and the second mirror before being reflected from said first mirror to said second mirror, said second mirror positioned behind said display screen so that said light beam from said projector is reflected from said second mirror through the light beam between the display screen and the second mirror before impinging on the rear display screen so that the image is viewable from the front side of said display screen.

2. The projector system of claim 1 wherein said first mirror is fixedly mounted within the projector system.

3. The projector system of claim 1 wherein said second mirror is positionably mounted within said projector system to allow a user to adjust the position of said image on said display screen.

4. The projector system of claim 1 wherein said projector is fixedly mounted within the projector system.

5. The projector system of claim 1 wherein said second mirror is in a concave shape to reduce the size of the image appearing on said viewing surface.

6. The projector system of claim 1 wherein said second mirror is in a convex shape to broaden the size of said image appearing on said display screen.

7. A combinatorial compact projector system comprising:
    a rear display screen having a back side and a front side with a front viewing surface, said rear display screen having a viewing axis;
        a plurality of projectors, each of said plurality of projectors for emitting light beams carrying images therein;
        a plurality of first mirrors, said plurality of first mirrors positioned laterally of said viewing axis and at an oblique angle to said display screen so that the light beams from each of said plurality of projectors are reflected away from the display screen;
        a plurality of second mirrors, said plurality of second mirrors positioned behind said rear display screen so that the light beams from each of said projectors projects between a one of the plurality of second mirrors and the rear display screen before being reflected from one of said plurality of first mirrors to said plurality of second mirrors, said plurality of second mirrors positioned behind said display screen so that each of said light beams are reflected through themselves and past said plurality of first mirrors before impinging on the rear display screen so that the images are viewable from the front side of said display screen, said images contained within blending together seamlessly on said display screen to form a single contiguous image thereon.

8. A method of projecting an image onto a rear display set comprising the steps of:
    directing a first image rearward of a rear display screen and at a first mirror positioned rearward of the rear display screen to reflect the image away from the rear display screen;
    directing a second image rearward of a rear display screen and at a second mirror positioned rearward of the rear display screen to reflect the image away from the rear display screen;
    directing each of the images across itself before directing the images on the rear display screen; and
    positioning a second mirror rearward of the display screen so that before the image is reflected away from the rear display screen the image is directed between the second mirror and the display screen before the image is directed toward the rear of the display screen to provide a image viewable on a front side of the rear display screen.

9. The method of claim 8 including fixedly mounting of an imager, the rear display screen and the first mirror to prevent relative movement of the images on the rear display screen.

* * * * *